United States Patent
Azzouz et al.

(10) Patent No.: US 10,350,972 B2
(45) Date of Patent: Jul. 16, 2019

(54) MID-GATE ASSEMBLY FOR A MOTOR VEHICLE

(71) Applicant: FORD GLOBAL TECHNOLOGIES, LLC, Dearborn, MI (US)

(72) Inventors: Michael Musa Azzouz, Livonia, MI (US); Sino Johan Van Dyk, Plymouth, MI (US); Noah Barlow Mass, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/262,555

(22) Filed: Sep. 12, 2016

(65) Prior Publication Data

US 2018/0072140 A1 Mar. 15, 2018

(51) Int. Cl.
  *B60J 5/00* (2006.01)
  *B62D 33/02* (2006.01)
  *B62D 33/027* (2006.01)
  *B62D 33/06* (2006.01)

(52) U.S. Cl.
  CPC ............... *B60J 5/00* (2013.01); *B62D 33/02* (2013.01); *B62D 33/0273* (2013.01); *B62D 33/06* (2013.01)

(58) Field of Classification Search
  CPC ........ B60J 5/00; B62D 33/02; B62D 33/0273; B62D 33/06
  See application file for complete search history.

(56) References Cited

U.S. PATENT DOCUMENTS

| | | |
|---|---|---|
| 6,481,772 B1 | 11/2002 | Tenn |
| 6,513,863 B1 | 2/2003 | Renke et al. |
| 6,786,535 B1 | 9/2004 | Grzegorzewski et al. |
| 6,796,600 B1 * | 9/2004 | Ferer ..................... B60J 1/2011 296/146.1 |
| 7,845,712 B2 * | 12/2010 | Gordon ................... B60J 10/80 296/190.11 |
| 8,246,101 B2 | 8/2012 | Cicala |

* cited by examiner

*Primary Examiner* — D Glenn Dayoan
*Assistant Examiner* — Melissa A Black
(74) *Attorney, Agent, or Firm* — Jason Roger; Vichit Chea; King & Schickli, PLLC (57) ABSTRACT

A mid-gate assembly includes a mid-gate and a first access panel received in the mid-gate. A window pocket extends through the mid-gate and the first access panel. Further, a window is displaceable between an extended position projecting from the mid-gate and a retracted position held in the window pocket.

18 Claims, 8 Drawing Sheets

MID-GATE ASSEMBLY FOR A MOTOR VEHICLE

TECHNICAL FIELD

This document relates generally to the motor vehicle equipment field and, more particularly, to a mid-gate assembly for a motor vehicle as well as to a motor vehicle incorporating that mid-gate assembly.

BACKGROUND

Motor vehicles, such as super cab and crew cab pickup trucks, include a passenger cabin and a cargo bed aft of the passenger cabin. When such a vehicle is equipped with a mid-gate assembly the aft portion of the passenger cabin may be converted to form a part of an expanded cargo bed thereby increasing the versatility of the motor vehicle.

This document relates to a new and improved mid-gate assembly that incorporates a full width power window, eliminates the need for a separate mid-gate cross beam and provides one or more access panels in the mid-gate that pivot about a common axis with the mid-gate. Such a mid-gate assembly provides enhanced versatility and is particularly user friendly. As such, the mid-gate assembly disclosed in this document represents a significant advance in the art.

SUMMARY

In accordance with the purposes and benefits described herein, a mid-gate assembly is provided for a motor vehicle. That mid-gate assembly comprises a mid-gate, a first access panel received in the mid-gate and a window pocket extending through the mid-gate and the first access panel. The mid-gate assembly also includes a window displaceable between an extended position projecting from the mid-gate and a retracted position held in the window pocket. For purposes of this document, the "extended position" is understood to mean that the larger portion of the window projects from the mid-gate. For purposes of this document, "retracted position" means that all or the larger portion of the window is held in the window pocket.

The mid-gate assembly may further include a hinge assembly that pivotally connects the mid-gate and the first access panel to a support structure such as a cross member of the body or the frame of the motor vehicle. The mid-gate and the first access panel may share a common pivot axis.

The mid-gate assembly may also include a second access panel received in the mid-gate. The hinge assembly may also pivotally connect that second access panel to the support structure. Further, that second access panel may also share the common pivot axis with the first access panel and the mid-gate. Still further, the mid-gate may include a pass-through opening and the first access panel and the second access panel may close that pass-through opening when in a first closed position. In some embodiments, the first access panel may be larger than the second access panel. For example, the first access panel may be 50% larger than the second access panel in order to provide a 60/40 split arrangement.

The window pocket may also extend through the second access panel. In addition, a first window track and a second window track may be carried in the mid-gate. In such an embodiment, the window may overlap the first access panel, the second access panel and the pass-through opening. Further, a first end of the window may travel along the first window track and a second end of the window may travel along the second window track as the window is displaced between the extended position and the retracted position. A regulator may be carried on the mid-gate in order to displace the window between the extended position and the retracted position.

In addition, a latch mechanism may be provided for releasably securing the mid-gate in a second closed position. In addition, the mid-gate may be substantially n-shaped.

In accordance with still another aspect, a mid-gate assembly comprises a mid-gate, a first access panel received in the mid-gate and a hinge assembly pivotally connecting the mid-gate and the first access panel to a support structure. The mid-gate and the first access panel may share a common pivot axis. Further, the mid-gate may include a second access panel received in the mid-gate. That second access panel may be pivotally connected to the support structure by the hinge assembly. Further, the second access panel may share the common pivot axis with the first access panel and the mid-gate.

In accordance with yet another aspect, a motor vehicle is provided. That motor vehicle comprises a passenger cabin, a cargo bed and a mid-gate assembly provided between the passenger cabin and the cargo bed. The mid-gate assembly may include: (a) a mid-gate, (b) a first access panel received in the mid-gate, (c) a window pocket extending through the mid-gate and the first access panel and (d) a window displaceable between an extended position projecting from the mid-gate and a retracted position held in the window pocket.

The motor vehicle may further include a hinge assembly. That hinge assembly may pivotally connect the mid-gate and the first access panel to a support structure about a common pivot axis.

In the following description, there are shown and described several preferred embodiments of the mid-gate and a motor vehicle incorporating the mid-gate. As it should be realized, the mid-gate and the motor vehicle are capable of other, different embodiments and their several details are capable of modification in various, obvious aspects all without departing from the mid-gate and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the mid-gate assembly and together with the description serve to explain certain principles thereof. In the drawing figures:

In FIG. 4a, the mid-gate assembly is closed and the window is extended or raised so as to fully partition the passenger cabin from the cargo bed.

In FIG. 4b, the mid-gate is closed but the window is retracted or lowered.

In FIG. 4c, the mid-gate is closed, the window is closed but the second access panel is opened.

In FIG. 4d, the mid-gate is closed, the window is closed but the first and second access panels are opened.

In FIG. 4e, the mid-gate is opened with the window fully retracted within the mid-gate.

Reference will now be made in detail to the present preferred embodiments of the mid-gate assembly, examples of which are illustrated in the accompanying drawing figures.

DETAILED DESCRIPTION

Figure 1:
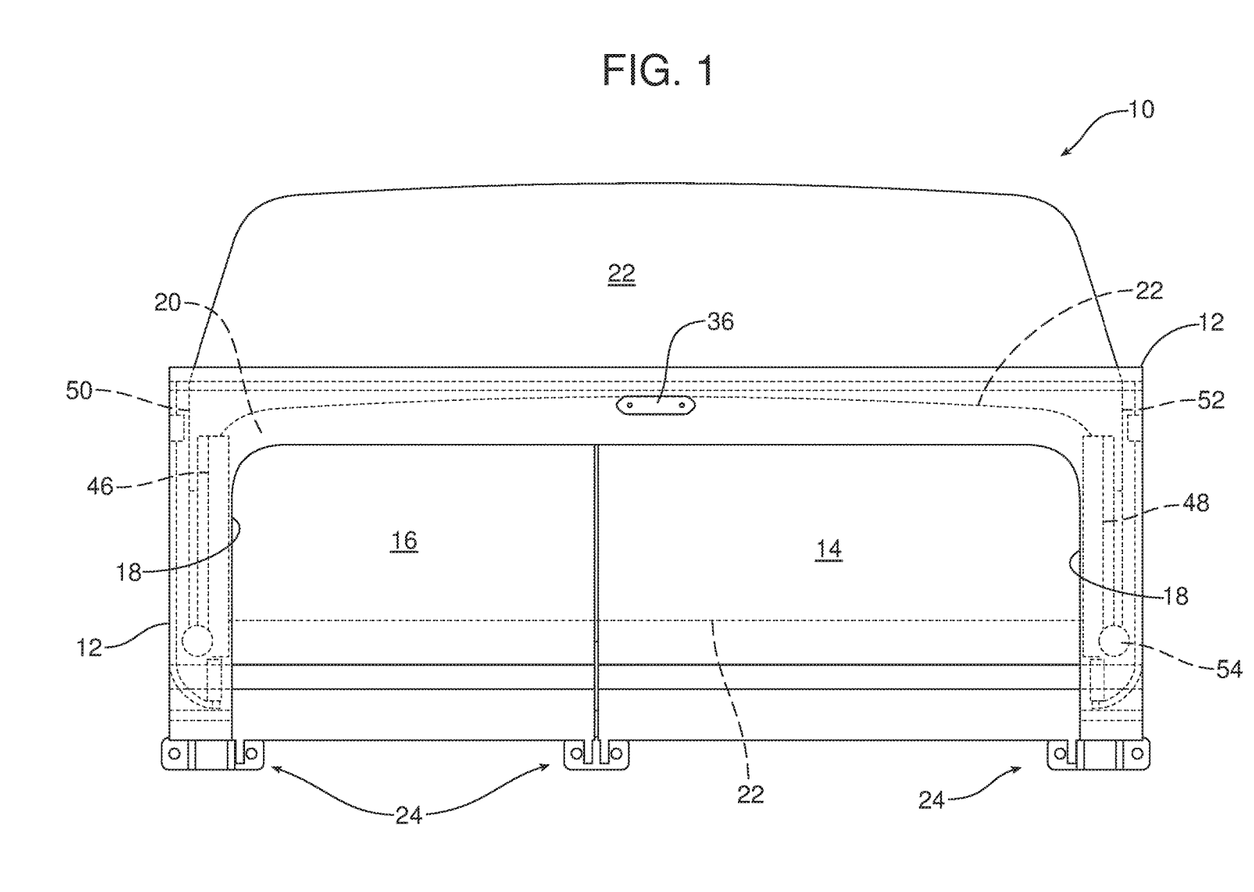
FIG. 1 is a detailed front plan view of the mid-gate assembly with the window in the extended position and the first and second access panels closing the pass-through opening in the mid-gate.
Figure 2:
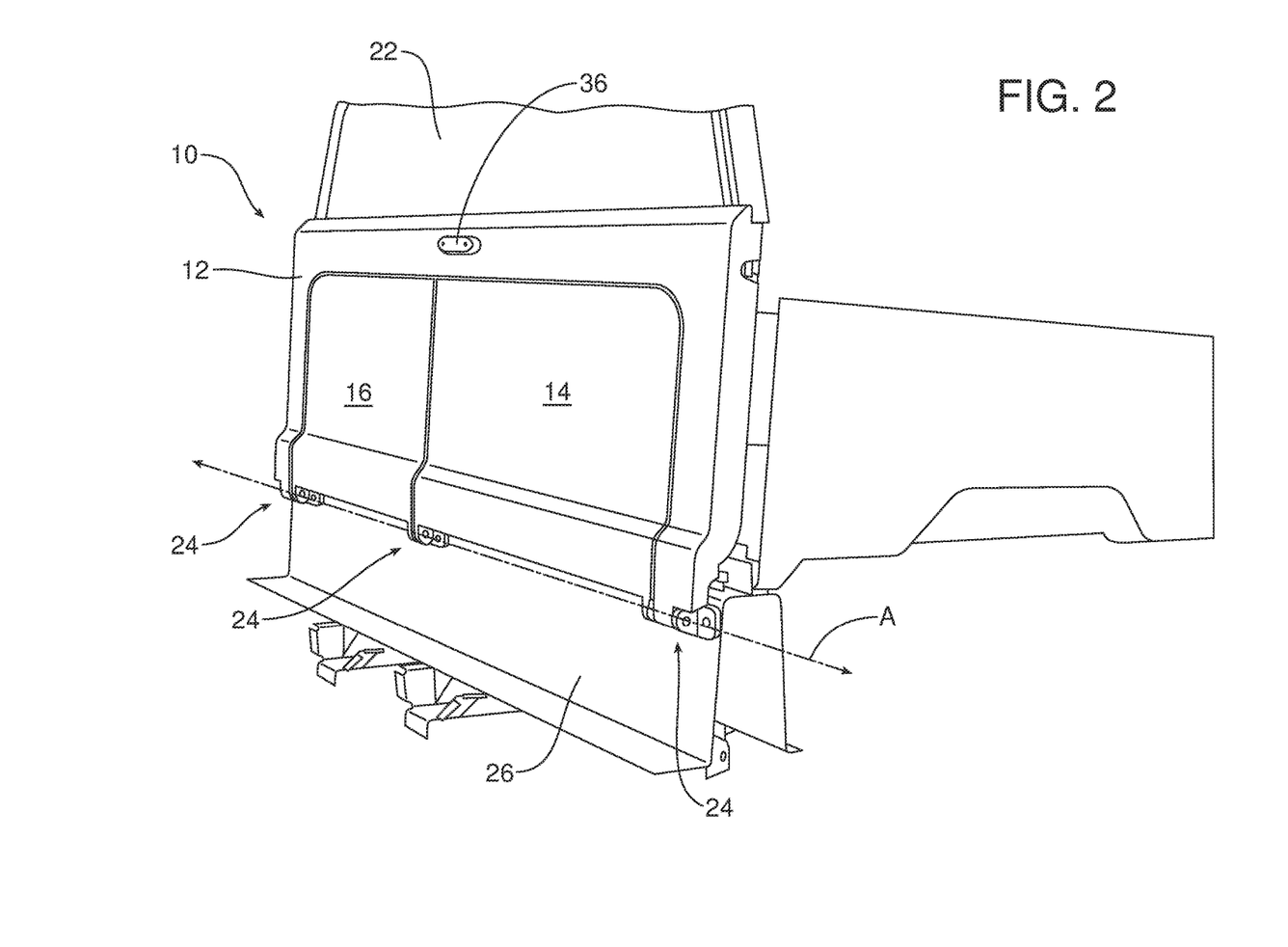
FIG. 2 is a perspective view illustrating the hinge assembly that pivotally connects the mid-gate, the first access panel and the second access panel to a support structure of the motor vehicle.
Figure 3:
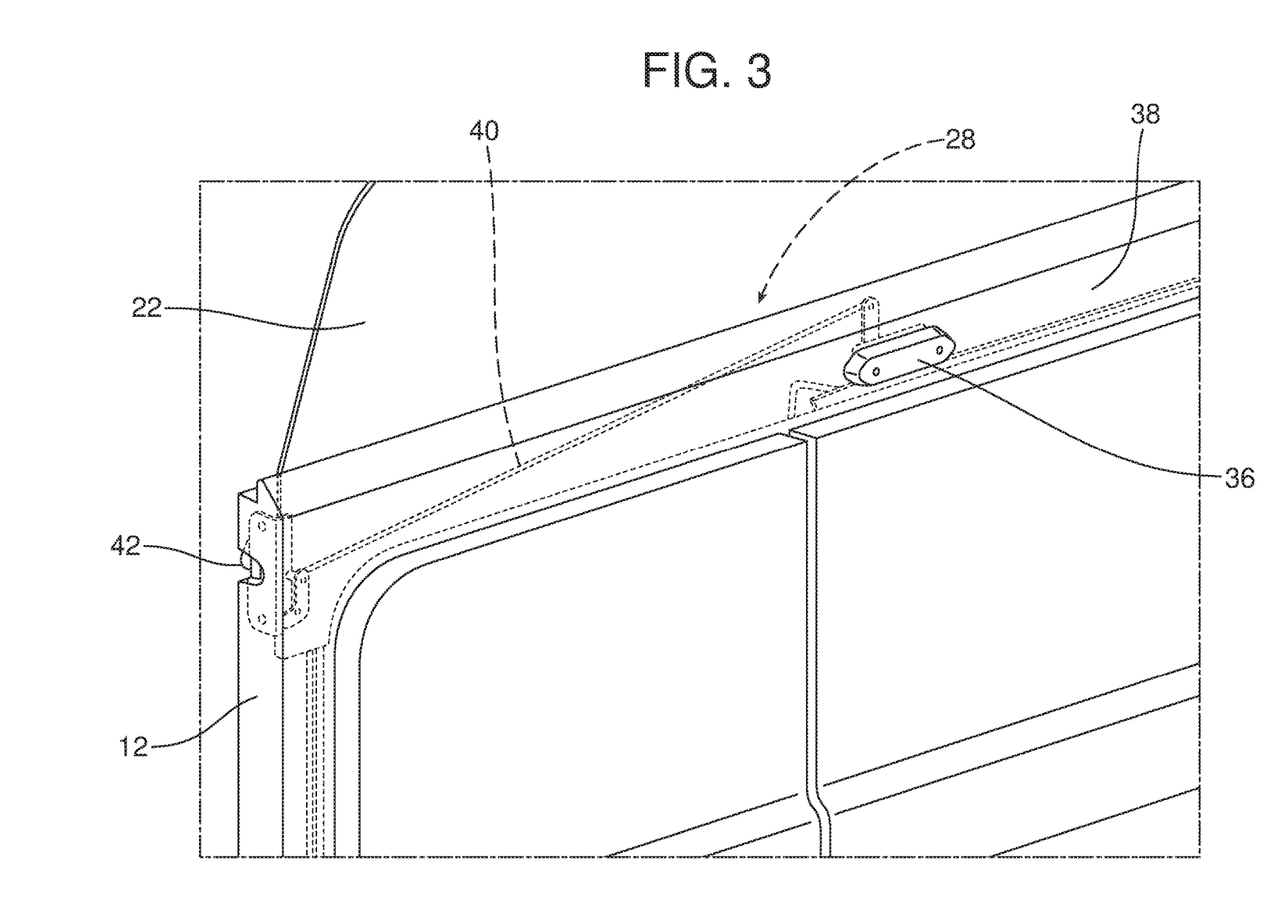
FIG. 3 is a detailed perspective view illustrating the latch mechanism utilized to secure the mid-gate assembly in a closed position so as to partition the passenger cabin from the cargo bed of the motor vehicle.

Reference is now made to FIGS. 1-3 which illustrate a new and improved mid-gate assembly 10. As illustrated, the mid-gate assembly 10 includes a mid-gate 12, a first access panel 14 received in the mid-gate and a second access panel 16 received in the mid-gate adjacent the first access panel. In the illustrated embodiment the mid-gate 12 is substantially n-shaped and includes a pass-through opening 18 closed by the first access panel 14 and the second access panel 16 when the first access panel and the second access panel are in the closed position.

The mid-gate assembly 10 also includes a window pocket 20 that extends through the mid-gate 12, the first access panel 14 and the second access panel 16. Further, the mid-gate assembly 10 includes a window 22 that is displaceable between an extended position (illustrated in FIGS. 1, 4a, 4c and 4d), projecting from mid-gate 12 and a retracted position (illustrated in FIGS. 4b and 4e) held in the window pocket 20. A hinge assembly, generally designated by reference numeral 24, pivotally connects the mid-gate 12, the first access panel 14 and the second access panel 16 to a support structure 26 such as a cross member of the motor vehicle body or frame (see FIG. 2). In the illustrated embodiment, the mid-gate 12, the first access panel 14 and the second access panel 16 all share a common pivot axis A.

In the illustrated embodiment, the first access panel 14 is larger than the second access panel 16. As illustrated, the first access panel 14 is approximately 50% larger so that the first access panel 14 and the second access panel 16 are in what is known as a 60/40 configuration. It should be appreciated that the first and second access panels 14, 16 may be the same size or different sizes than the configurations shown.

As illustrated in FIG. 3, the mid-gate assembly 10 may also include a latch mechanism 28 for releasably securing the mid-gate 12 in a closed position partitioning the passenger cabin 30 from the aft cargo bed 32 of the motor vehicle 34. (See FIG. 4a) As illustrated in FIGS. 4b-4e and described in greater detail below, the mid-gate assembly 10 may also assume at least four other operating configurations.

The latch assembly 28 of the illustrated embodiment includes an actuator or latch handle 36 that may be centrally located on an inside face 38 of the mid-gate. A linkage 40 connects the latch handle 36 to a pivoting latch jaw 42 which engages a striker (not shown) mounted to the passenger cabin 30 of the motor vehicle when the mid-gate 12 is in the closed position. While not clearly illustrated in FIG. 3, the linkage 40 connects the latch handle 36 to a similar latch jaw 42 at the opposite side of the mid-gate 12 which engages a second striker (also not shown).

As should be apparent from viewing FIG. 1, the window 22 of the mid-gate 12 may be a power window. Accordingly, the mid-gate assembly 10 includes a first window track 46 carried on a first side of the mid-gate 12 and a second window track 48 carried on a second side of the mid-gate. The window 22 overlaps the first access panel 14, the second access panel 16 and the pass-through opening 18 in the mid-gate 12. A first end 50 of the window 22 travels along the first window track 46 while a second end 52 of the window travels along the second window track 48 when the window is displaced between the extended position illustrated in full line in FIG. 1 and the retracted position illustrated in phantom line in FIG. 1. A regulator 54 carried on the mid-gate 12 provides the power to displace the window 22 between the extended and retracted positions.

Reference is now made to FIGS. 4a-4e which illustrate a motor vehicle 34 including the passenger cabin 30, a cargo bed 32 aft of the passenger cabin and the mid-gate assembly 10 that is provided in opening 56 in the rear wall 58 of the passenger cabin.

Figure 4A:
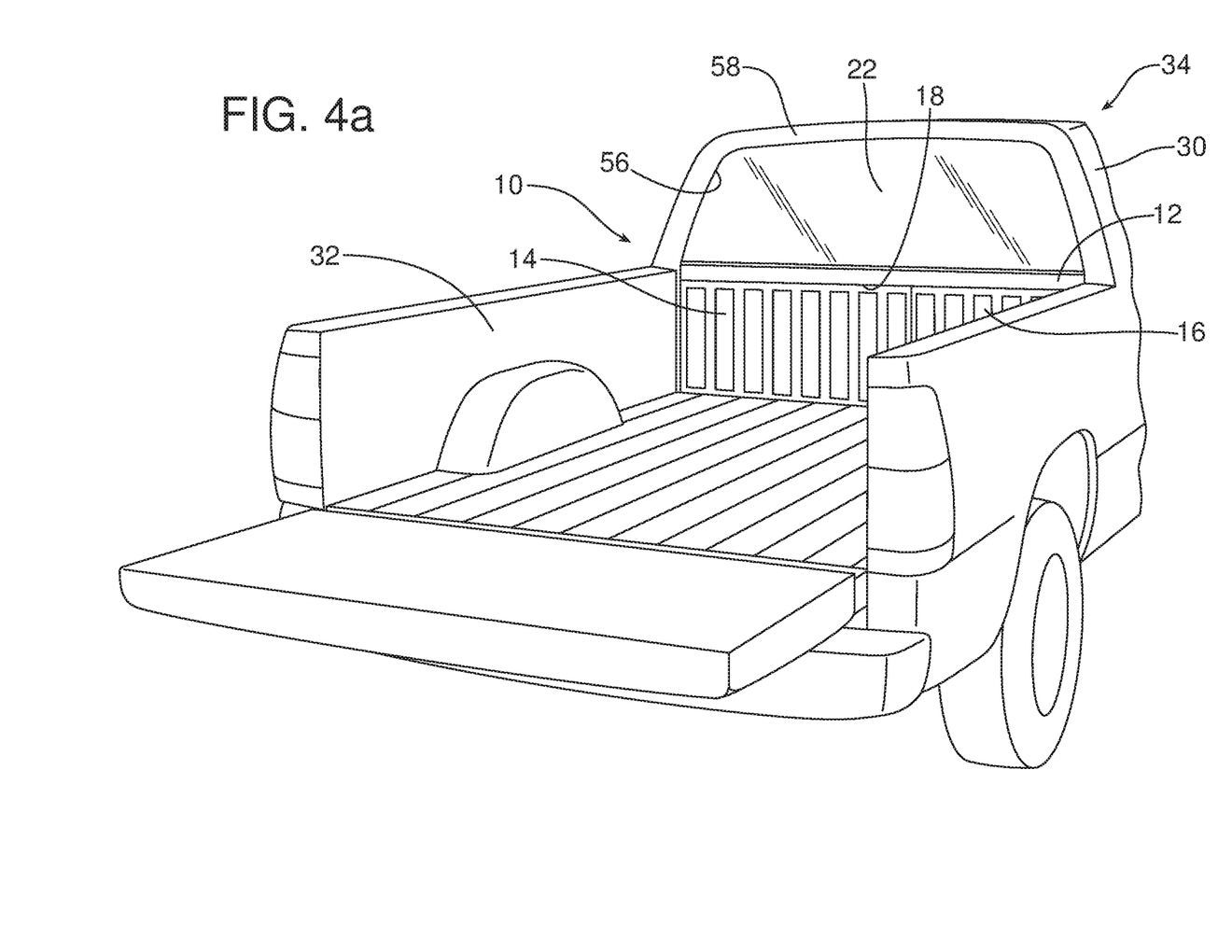
FIGS. 4a-4e illustrate a motor vehicle including a passenger cabin, a cargo bed and a mid-gate assembly wherein that mid-gate assembly is in five different operating configurations.

When the mid-gate assembly 10 is in the fully closed position illustrated in FIG. 4a, the mid-gate 12 is in the closed position where it is secured by the latch mechanism 28. The first access panel 14 and second access panel 16 are also in the closed position thereby closing the pass-through opening 18 in the mid-gate 12. Further, the window 22 is in the extended position. Thus, as illustrated in FIG. 4a, the mid-gate 12 and the extended window 22 close and seal the opening 56 in the rear wall 58 of the passenger cabin 30 thereby effectively partitioning the passenger cabin from the cargo bed 32.

Figure 4B:
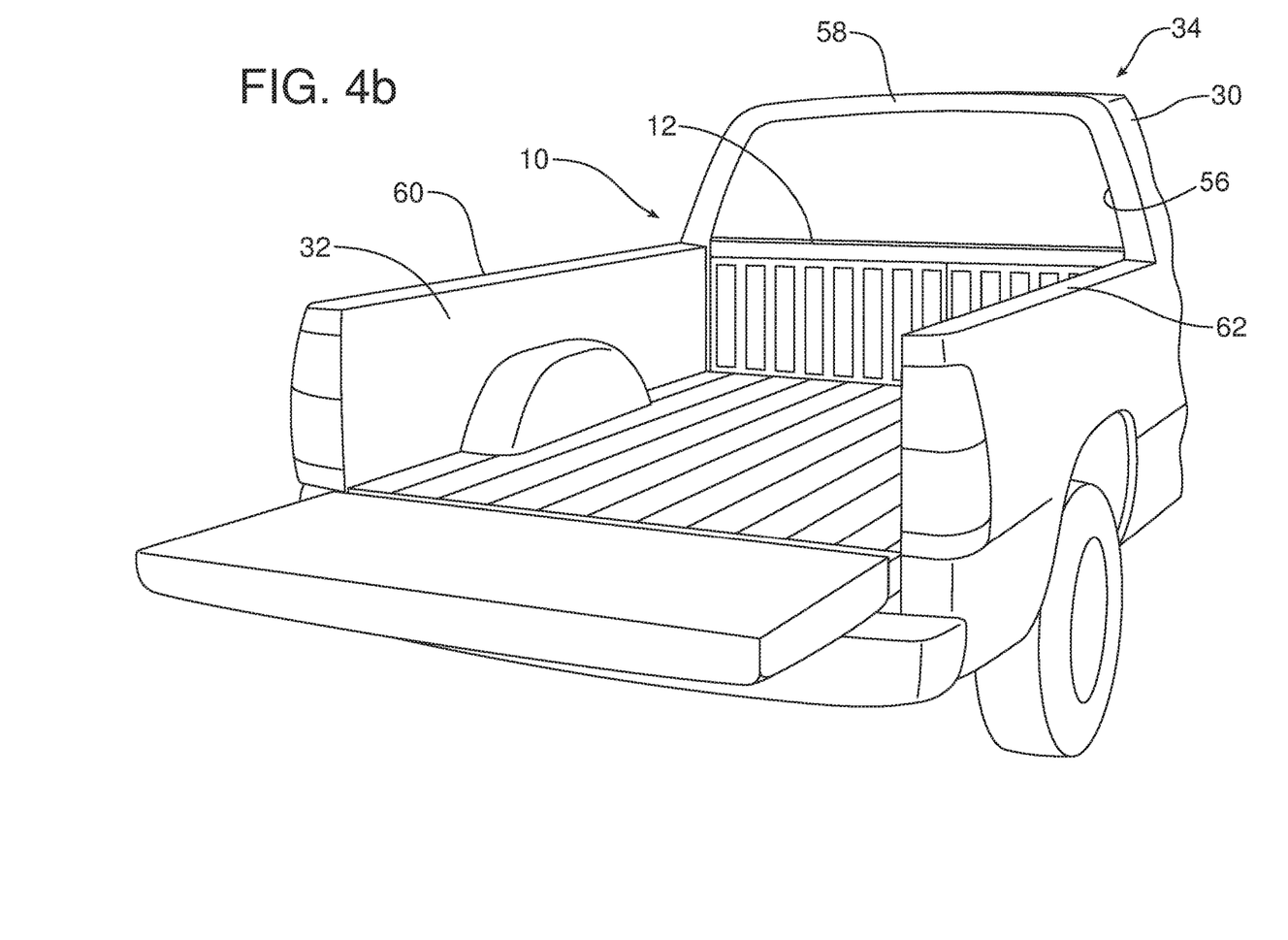

FIG. 4b illustrates a second operating configuration for the mid-gate assembly 10 wherein the mid-gate 12 and the first and second access panels 14, 16 are all closed but the window 22 has been displaced to the retracted position wherein the window is held in the window pocket 20 running through the mid-gate, first access panel and second access panel. In this configuration, the mid-gate 12 forms the forward wall of the cargo bed 32 extending between the cargo bed sidewalls 60, 62. The upper portion of the opening 56 and the rear wall 58 of the cargo cabin is, however, now open.

Figure 4C:
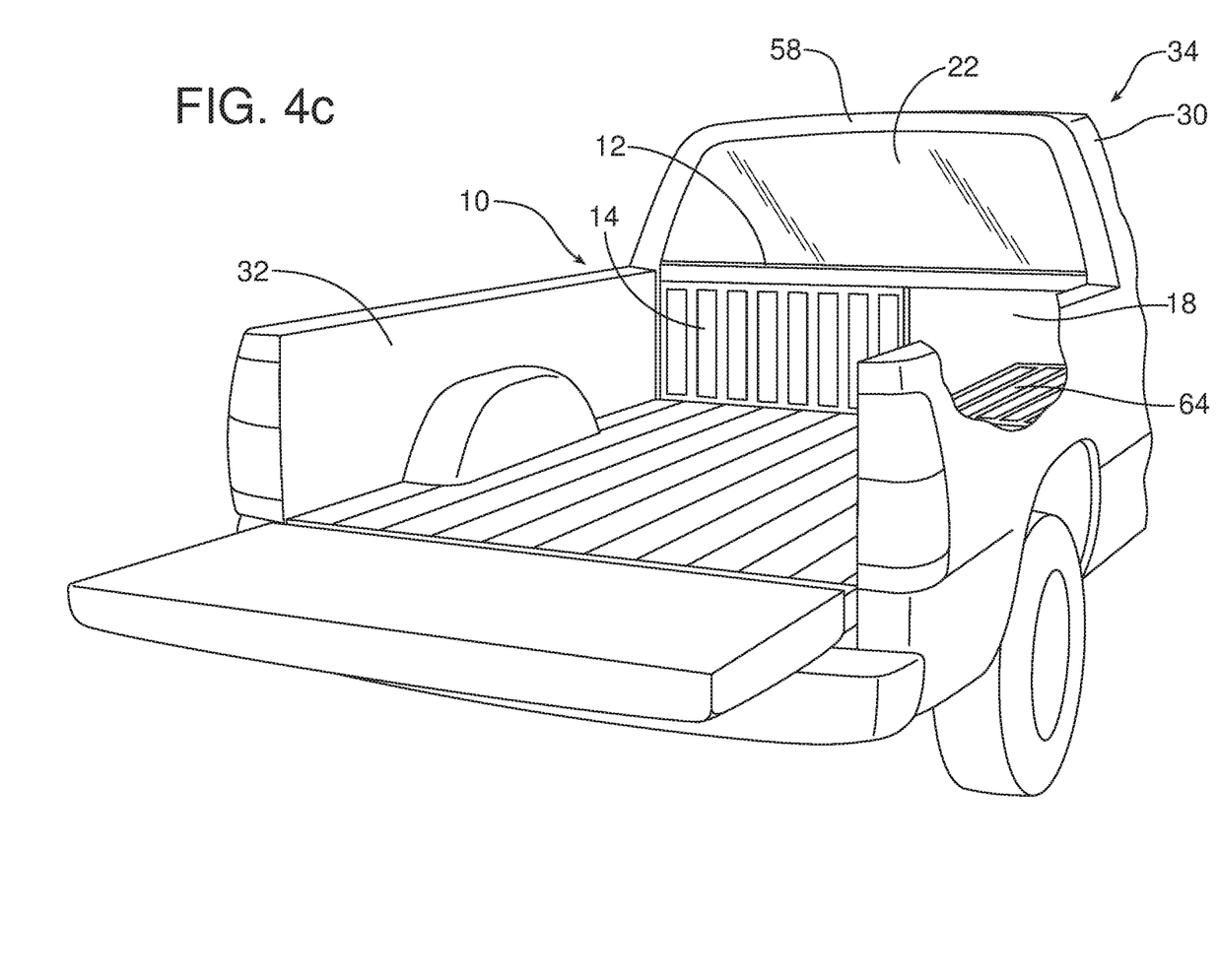

In the third operating configuration illustrated in FIG. 4c, the mid-gate 12 and the first access panel 14 are closed, the window 22 is in the extended or closed position and the second access panel 16 is open. In this configuration, rear row passenger seating is still available in the passenger cabin 30 in front of the first access panel 14. In contrast, the face 64 of the second access panel 16 that has been opened rests in the plane of the cargo bed 32 thereby forming a cargo bed of extended length extending partially into the passenger cabin 30 in front of the open portion of the pass-through opening 18. As illustrated in FIG. 4c, the second or smaller access panel 16 is opened while the first or larger access panel 14 is closed. It should be appreciated that the two access panels 14, 16 could be in the opposite configuration if desired.

Figure 4D:
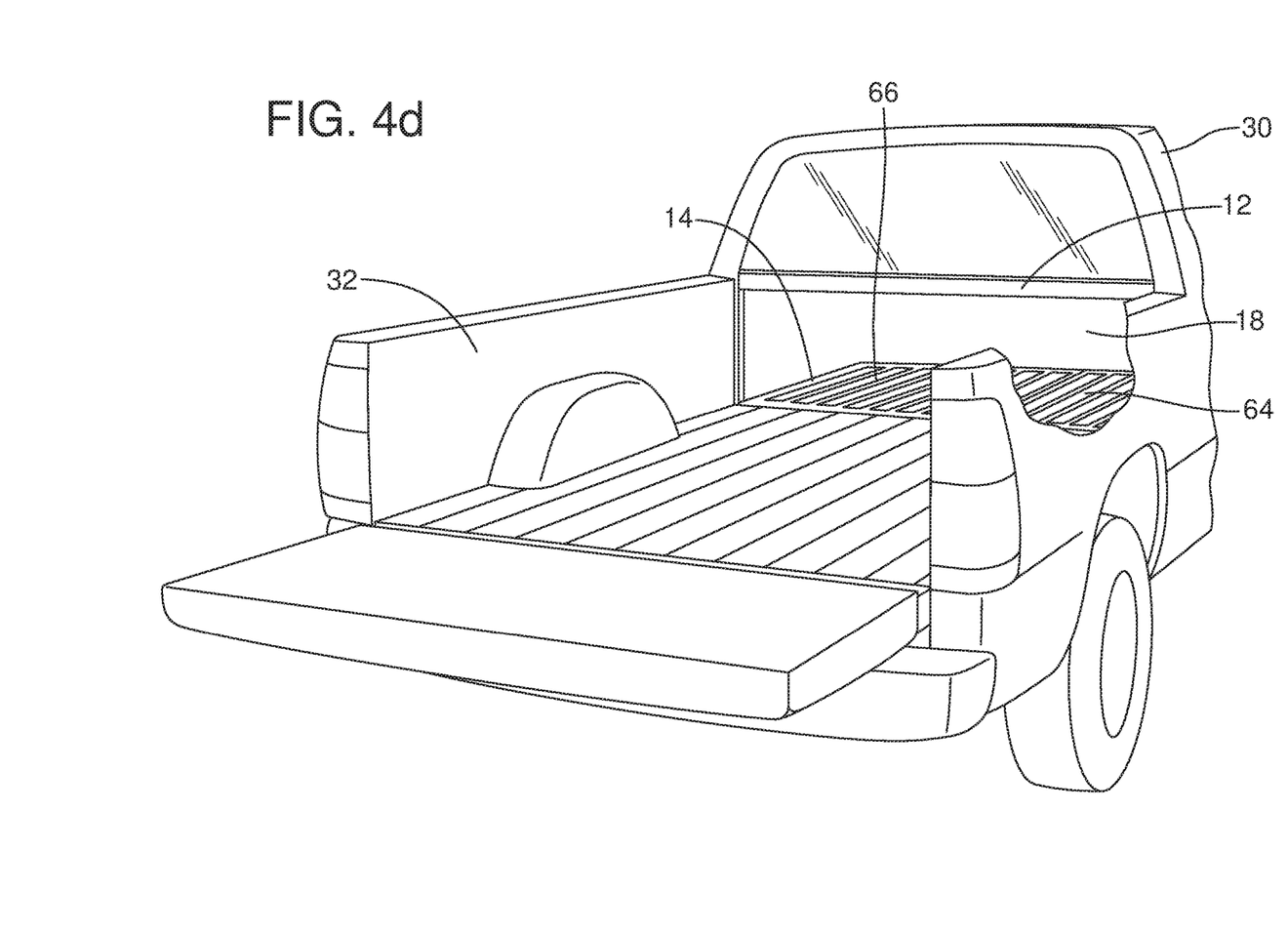

A fourth operating configuration is illustrated in FIG. 4d. As illustrated in FIG. 4d, the mid-gate 12 is closed and the window 22 is in the extended or closed position. In contrast, the first access panel 14 and the second access panel 16 are both opened thereby opening the entire pass-through opening 18. As should be appreciated, the faces 66 and 64 of the first and second access panels 14, 16 lie flat with the cargo bed 32 forming an extended cargo bed that projects into the passenger cabin 30 through the pass-through opening 18 in the mid-gate 12 underneath the window 22.

Figure 4E:
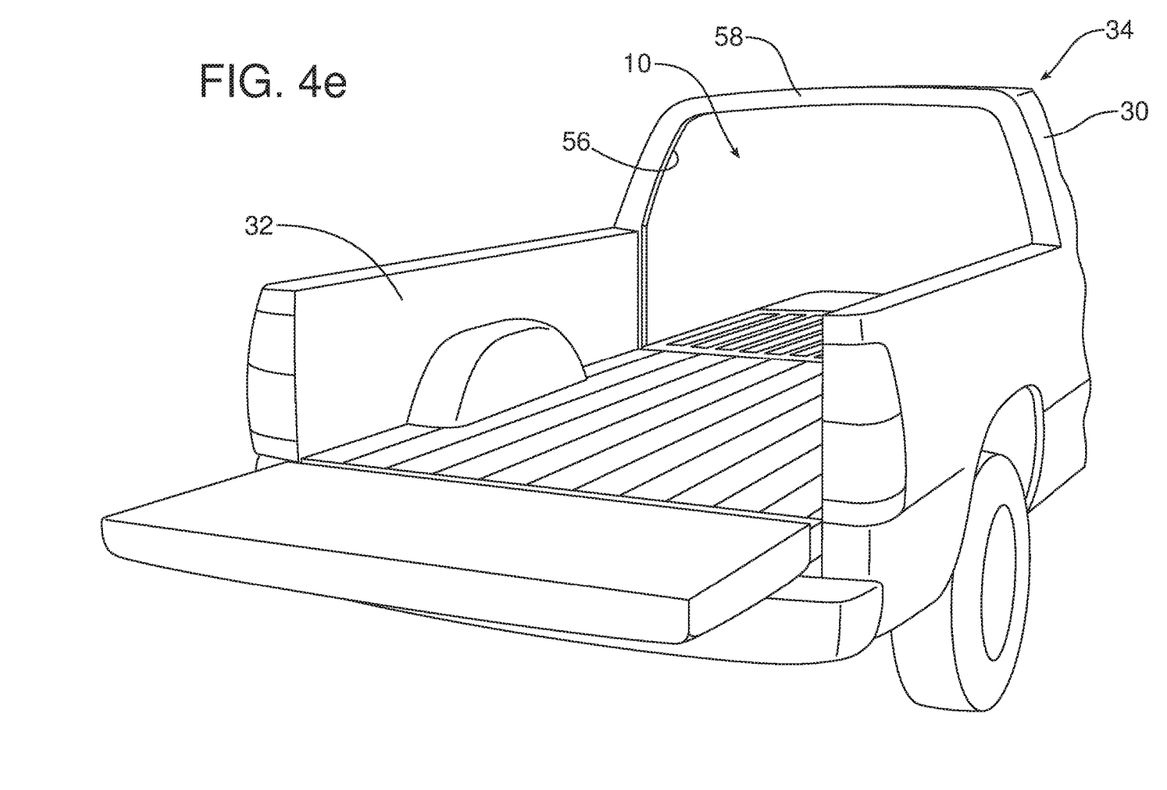

A fifth operating configuration is illustrated in Figure E. In this configuration, the window 22 is in the retracted position where it is held in the window pocket 20 extending through the first access panel 14, the second access panel 16 and the mid-gate 12. The first and second access panels 14, 16 are closed, closing the pass-through opening 18 and the mid-gate 12 is opened so that the mid-gate assembly 10 forms a flat extended cargo bed 32 and the opening 56 in the rear wall 58 of the passenger cabin 30 is fully opened.

Since the window 22 fully spans the pass-through opening 18 and is received in the window pocket 20 extending through the mid-gate 12, first access panel 14 and second access panel 16, it should be appreciated that power window operation is only possible when the mid-gate 12 is secured by the latch mechanism 28 in the closed position and the first and second access panels 14, 16 are also in the fully closed position closing the pass-through opening. Thus, it should be appreciated that the window 22 may only be operated when the mid-gate assembly 10 is in the position illustrated in FIGS. 4a and 4b. Further, the window 22 must be fully opened and retracted into the window pocket 20 before the latch mechanism 28 may be operated to open the mid-gate 12 as illustrated in FIG. 4e.

As should be appreciated from the foregoing, the mid-gate assembly 10 provides a number of benefits and advantages. The mid-gate assembly 10 provides the convenience of a power window 22, the versatility of a pass-through opening 18 with first and second access panels 14, 16 and simple operation by means of the latch mechanism 28 that allows one to unlatch the mid-gate 12 and displace the mid-gate to the open or lowered position illustrated in FIG. 4e when the window 22 is in the retracted position. As should be appreciated, the mid-gate assembly 10, including the mid-gate 12, the first access panel 14, the second access panel 16 and the window 22 form an integral assembly. There is no need to separately remove the window. Further, the mid-gate assembly 10 is devoid of any separate cross beam commonly found in prior art mid-gate designs.

Thus, the mid-gate assembly 10 is particularly simple in construction and easy to use.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the mid-gate 12, the first access panel 14 and the second access panel 16 all share a common pivot axis A. It should be appreciated that only two of three structures may share a common axis. In still other embodiments, each of the structures may have its own axis with none in common. All such modifications and variations are within the scope of the appended claims when interpreted in accordance with the breadth to which they are fairly, legally and equitably entitled.

What is claimed:

1. A mid-gate assembly, comprising:
a displaceable mid-gate including a pass-through opening;
a first access panel received in said pass-through opening of said mid-gate;
a hinge assembly individually connecting said mid-gate to a support structure and said first access panel to said support structure;
a window pocket extending through said mid-gate and said first access panel; and
a window displaceable between an extended position projecting from said mid-gate and a retracted position held in said window pocket.

2. The mid-gate assembly of claim 1, wherein said mid-gate and said first access panel have a common pivot axis.

3. The mid-gate assembly of claim 1, further including a second access panel received in said pass-through opening of said mid-gate.

4. The mid-gate assembly of claim 3, wherein said hinge assembly also individually connects said second access panel to said support structure.

5. The mid-gate assembly of claim 4, wherein said mid-gate, said first access panel and said second access panel all share a common pivot access.

6. The mid-gate assembly of claim 4, wherein said first access panel and said second access panel close said pass-through opening when in a first closed position.

7. The mid-gate assembly of claim 6, wherein said first access panel is larger than said second access panel and said first access panel is laterally disposed beside said second access panel.

8. The mid-gate assembly of claim 7, wherein said window pocket also extends through said second access panel.

9. The mid-gate assembly of claim 8, further including a first window track and a second window track carried in said mid-gate.

10. The mid-gate assembly of claim 9, wherein (a) said window overlaps said first access panel, said second access panel and said pass-through opening and (b) a first end of said window travels along said first window track and a second end of said window travels along said second window track as said window is displaced between said extended position and said retracted position.

11. The mid-gate assembly of claim 10, further including a latch mechanism for releasably securing said mid-gate in a second closed position.

12. The mid-gate assembly of claim 10, further including a regulator carried on said mid-gate for displacing said window.

13. The mid-gate assembly of claim 1, wherein said mid-gate is substantially n-shaped.

14. A mid-gate assembly, comprising:
a displaceable mid-gate including a pass-through opening;
a first access panel received in said pass-through opening of said mid-gate; and
a hinge assembly pivotally and independently connecting said mid-gate and said first access panel to a support structure.

15. The mid-gate assembly of claim 14, wherein said mid-gate and said first access panel share a common pivot axis.

16. The mid-gate assembly of claim 15, further including a second access panel received in said pass-through opening of said mid-gate.

17. The mid-gate assembly of claim 16, wherein said second access panel is pivotally and independently connected to said support structure by said hinge assembly and said second access panel shares said common pivot axis.

18. A motor vehicle, comprising:
a passenger cabin;
a cargo bed; and
a mid-gate assembly between said passenger cabin and said cargo bed, said mid-gate assembly including: (a) a displaceable mid-gate including a pass-through opening, (b) a first access panel received in said pass-through opening of said mid-gate, (c) a hinge assembly individually connecting said mid-gate and said first access panel to a support structure about a common pivot axis, (d) a window pocket extending through said mid-gate and said first access panel and (e) a window displaceable between an extended position projecting from said mid-gate and a retracted position held in said window pocket.

* * * * *